(12) United States Patent
Schmid et al.

(10) Patent No.: US 7,540,150 B2
(45) Date of Patent: Jun. 2, 2009

(54) INTERNAL COMBUSTION ENGINE HAVING TWO EXHAUST GAS TURBOCHARGER

(75) Inventors: Wolfram Schmid, Nürtingen (DE); Siegfried Sumser, Stuttgart (DE)

(73) Assignee: Daimler AG, Stuttgart (DE)

( * ) Notice: Subject to any disclaimer, the term of this patent is extended or adjusted under 35 U.S.C. 154(b) by 85 days.

(21) Appl. No.: 11/508,738

(22) Filed: Aug. 23, 2006

(65) Prior Publication Data
US 2007/0107430 A1 May 17, 2007

Related U.S. Application Data

(63) Continuation-in-part of application No. PCT/EP2005/001908, filed on Feb. 4, 2005.

(30) Foreign Application Priority Data

Feb. 28, 2004 (DE) .................. 10 2004 009 794

(51) Int. Cl.
F02B 37/00 (2006.01)
F02B 37/013 (2006.01)
F02B 37/18 (2006.01)
F02M 25/07 (2006.01)

(52) U.S. Cl. ............... 60/612; 60/605.2; 60/602; 123/562

(58) Field of Classification Search .......... 60/612, 60/602, 605.2; 123/562; F02B 37/00, 37/013, F02B 37/18; F02M 25/07
See application file for complete search history.

(56) References Cited

U.S. PATENT DOCUMENTS

| | | | |
|---|---|---|---|
| 4,179,892 A | 12/1979 | Heydrich | 60/605.2 |
| 5,611,203 A | 3/1997 | Henderson et al. | 60/605.2 |
| 5,794,445 A | 8/1998 | Dungner | 60/605.2 |
| 6,360,732 B1 * | 3/2002 | Bailey et al. | 60/612 |
| 6,378,308 B1 | 4/2002 | Pflüger | 60/612 |
| 6,397,598 B1 | 6/2002 | Pierpont | 60/612 |
| 6,973,787 B2 * | 12/2005 | Klingel | 60/612 |
| 7,051,527 B2 * | 5/2006 | Schmid et al. | 60/602 |
| 7,165,540 B2 * | 1/2007 | Brookshire et al. | 60/605.2 |
| 7,287,378 B2 * | 10/2007 | Chen et al. | 60/605.2 |
| 2006/0059908 A1 * | 3/2006 | Schorn et al. | 60/600 |
| 2006/0070381 A1 * | 4/2006 | Parlow et al. | 60/612 |
| 2006/0101819 A1 * | 5/2006 | Schorn et al. | 60/605.2 |
| 2007/0193270 A1 * | 8/2007 | Roozenboom et al. | 60/612 |
| 2008/0035111 A1 * | 2/2008 | Schmid et al. | 123/435 |

FOREIGN PATENT DOCUMENTS

| | | |
|---|---|---|
| DE | 197 44 936 | 4/1999 |
| DE | 101 35 118 | 2/2002 |
| DE | 101 51 196 | 7/2002 |

(Continued)

*Primary Examiner*—Thai-Ba Trieu
(74) *Attorney, Agent, or Firm*—Klaus J. Bach

(57) ABSTRACT

In an internal combustion engine provided with two exhaust gas turbochargers which each comprise a turbine in an exhaust line and one compressor in an intake section of the engine, two exhaust lines are provided which are each assigned to at least one of the exhaust gas turbines, an exhaust gas recirculation device being arranged between an exhaust line upstream of an exhaust gas turbine and the intake section downstream of a compressor and the two exhaust lines including bypass lines with a control valve for selectively permitting the exhaust gas to bypass the turbine closer to the engine.

7 Claims, 2 Drawing Sheets

FOREIGN PATENT DOCUMENTS

| | | |
|---|---|---|
| DE | 101 55 851 | 7/2002 |
| DE | 101 44 663 | 4/2003 |
| DE | 101 52 804 | 5/2003 |
| EP | 1 375 868 | 1/2004 |
| EP | 1640596 A1 * | 3/2006 |
| JP | 61164039 A * | 7/1986 |
| JP | 01193024 A * | 8/1989 |

* cited by examiner

INTERNAL COMBUSTION ENGINE HAVING TWO EXHAUST GAS TURBOCHARGER

This is a Continuation-In-Part Application of International Application PCT/EP2005/001908 filed Feb. 04, 2005 and claiming the priority of German Application 102004009794.1 filed Feb. 02, 2004.

BACKGROUND OF THE INVENTION

The invention relates to an internal combustion engine having two exhaust gas turbochargers, each including a turbine and a compressor, disposed in series circuits and an exhaust gas recirculation line including a non-return valve connected to an exhaust duct upstream of an exhaust gas turbine for returning exhaust gas to a compressor air intake duct.

DE 101 44 663 A1 discloses an internal combustion engine having two exhaust gas turbochargers, a first turbocharger forming a high pressure stage, and the second turbocharger forming a low pressure stage. The high pressure stage is arranged near to the engine, and the low pressure stage is in contrast located at a relatively large distance from the internal combustion engine. The compressors of the two exhaust gas turbochargers are connected in series in the intake section, and the exhaust gas turbines of the two turbochargers are likewise arranged one behind the other in the exhaust gas section. Both the compressor and the turbine of the high pressure stage are each bypassed by a bypass which can be shut off, each bypass being able to be opened or closed as a function of engine state variables and engine operating variables. When the loads and engine speeds are low, the bypass around the compressor or the exhaust gas turbine of the high pressure stage is closed and the high pressure stage is activated. As the load and the engine speed increase, the bypass around the compressor or the turbine of the high pressure stage can be opened, as a result of which the high pressure stage is deactivated and the compressor work is to be carried out solely by the low pressure stage.

Such internal combustion engines with two-stage supercharging have a transient behavior which is improved compared to single stage supercharging. However, two stage supercharging does not have any direct influence on the exhaust gas behavior of the internal combustion engine.

In order to improve the exhaust gas behavior, in particular in order to reduce the $NO_x$ emissions it is basically known to re-circulate exhaust gas from the exhaust gas section into the intake section. Such recirculation of exhaust gas is carried out in particular in the partial load operating mode of the internal combustion engine and is described, for example, in document DE 101 52 804 A1. The internal combustion engine is equipped with an exhaust gas turbocharger whose exhaust gas turbine has two different exhaust gas flows of different sizes via which exhaust gas can be fed to the turbine wheel. Each cylinder bank of the internal combustion engine is in communication with one exhaust line. A recirculation line of the exhaust gas recirculation device branches off the smaller exhaust line which has a higher exhaust gas back pressure. The recirculation line extends to an intake duct section downstream of the compressor for returning the recirculation exhaust gas to the engine. The higher exhaust gas back pressure supports the recirculation of exhaust gases into the intake section and permits exhaust gas to be re-circulated over a wide operating range of the engine.

U.S. Pat. No. 6,397,598 B1 discloses an internal combustion engine with two exhaust gas turbochargers connected in series. The internal combustion engine has two cylinder banks with three cylinders each, the exhaust gas of each cylinder bank being fed into a separate exhaust line. The first exhaust line leads into the exhaust gas turbine which is near to the engine and which has a flow connection via a further line section to the second exhaust gas turbine which is remote from the engine. The second exhaust line leads directly into the second exhaust gas turbine which is remote from the engine.

Furthermore, in U.S. Pat. No. 6,397,598 B1 an exhaust gas recirculation device is provided which branches off from the first exhaust line which is connected to the exhaust gas turbine which is near the engine. An adjustable nonreturn valve is arranged in the recirculation line of the exhaust gas recirculation device.

With this configuration it is possible to bring about different exhaust gas backpressures in the two exhaust lines, which can be utilized for improved exhaust gas recirculation. However, the adjustment possibilities are restricted to regulating the nonreturn valve in the exhaust gas recirculation line. The level of the exhaust gas back pressure, in particular in the exhaust line which is coupled to the recirculation line, cannot be influenced—with the exception of regulating the nonreturn valve in the recirculation line.

Document U.S. Pat. No. 6,378,308 B1 discloses an internal combustion engine with two cylinder banks whose exhaust gas is fed in each case into one exhaust line, each exhaust line leading into an exhaust gas flow of a turbine which is near the engine. A further exhaust gas turbine which is remote from the engine is connected downstream of the two-flow exhaust gas turbine which is near the engine. A recirculation line which leads into the intake section downstream of the compressor and which is assigned to the exhaust gas turbine which is near the engine branches off from the exhaust gas collector of one of the two cylinder banks.

Furthermore, U.S. Pat. No. 6,378,308 B1 discloses a bypass in each exhaust line for optionally bypassing the exhaust gas turbine which is near the engine. Each bypass branches off upstream of the exhaust gas turbine which is near the engine and leads again into the exhaust line downstream of this exhaust gas turbine. The bypass mass flow rate can in each case be regulated via one intermediate nonreturn valve in each bypass.

It is the object of the present invention to improve the exhaust behavior of an internal combustion engine with two-stage supercharging by simple means.

SUMMARY OF THE INVENTION

In an internal combustion engine provided with two exhaust gas turbochargers which each comprise a turbine in an exhaust line and one compressor in an intake section of the engine, two exhaust lines are provided which are each assigned to at least one of the exhaust gas turbines, an exhaust gas recirculation device being arranged between an exhaust line upstream of an exhaust gas turbine and the intake section downstream of a compressor and the two exhaust lines including bypass lines with a control valve for selectively permitting the exhaust gas to bypass the turbine closer to the engine.

This arrangement requires only simple means for adjusting asymmetrical exhaust gas back pressures in the two exhaust lines in the section between the outlet of the cylinders of the internal combustion engine and the exhaust gas turbines. The asymmetry in the exhaust gas back pressures can be utilized for improved exhaust gas recirculation since that exhaust line participates in the recirculation of exhaust gas in which the exhaust gas back pressure exceeds the charge pressure in the intake section in certain operating states while, with the same operating conditions, a pressure which is below the charge pressure can be maintained in the second exhaust line.

The asymmetry can be achieved with structurally simple means. According to one advantageous embodiment, one of the two exhaust gas turbines is equipped with two separate exhaust gas inlet flows passages via which the exhaust gas is to be fed to the turbine wheel of the respective exhaust gas turbine. The two exhaust gas flows passages are each connected to one of the two separate exhaust lines. Using a different cross-sectional geometry and/or a different size of the two exhaust flow passages it is possible to generate different exhaust gas back pressures in the respective line sections between the internal combustion engine and the inlet to each exhaust gas flow passage.

Each of the two exhaust lines is expediently connected to some of the cylinders of the internal combustion engine so that likewise only the exhaust gases of the respective cylinders can be discharged via the exhaust line assigned to them. Usually the internal combustion engine has two cylinder banks with the same number of cylinders, the exhaust gases of each cylinder bank being discharged via one exhaust line in each case. However, it is also possible to have an asymmetrical distribution of the cylinders, and, with such an asymmetrical distribution, the particular exhaust line to which the exhaust gases of the larger number of cylinders are fed, also expediently participates in the recirculation of exhaust gas.

The two-flow gas turbine can be arranged either near to the engine or remote from the engine in the exhaust gas section. The exhaust gas recirculation line advantageously branches off upstream of the first of the two exhaust gas turbines connected in series, which is near the engine.

If the exhaust gas turbine which is near the engine includes two exhaust gas inlet flow passages, each of the two exhaust lines extending to one exhaust gas flow passages of the first exhaust gas turbine which is near the engine. The two exhaust lines are thus connected to the exhaust gas turbine which is near the engine. The exhaust gas recirculation line branches off from the exhaust line which carries the smaller of the two exhaust gas flows. The second exhaust gas turbine which is remote from the engine is connected via an exhaust line section in series with the first exhaust gas turbine which is near the engine.

In an alternative embodiment, wherein the second exhaust gas turbine which is remote from the engine includes two flow passages, one of the two exhaust gas flow passages is supplied with exhaust gases directly by the cylinders of the internal combustion engine via one of the exhaust lines while the second exhaust gas flow passage is connected in series with the first exhaust gas turbine which is near the engine, via the other exhaust line; in this embodiment the two exhaust lines are assigned to different exhaust gas turbines.

The two exhaust gas lines are advantageously in communication with one another via a bypass line with a nonreturn valve arranged therein. The bypass line permits exhaust gas to be transferred from the exhaust gas line with relatively high exhaust gas pressure to the exhaust gas line with relatively low exhaust gas back pressure in certain operating states of the internal combustion engine. This transfer process constitutes an additional possible way of intervening in order to influence the operating mode of the internal combustion engine.

The invention will become more readily apparent from the following description of an embodiment of the invention with reference to the accompanying drawings:

DESCRIPTION OF EMBODIMENTS OF THE INVENTION

Figure 1:
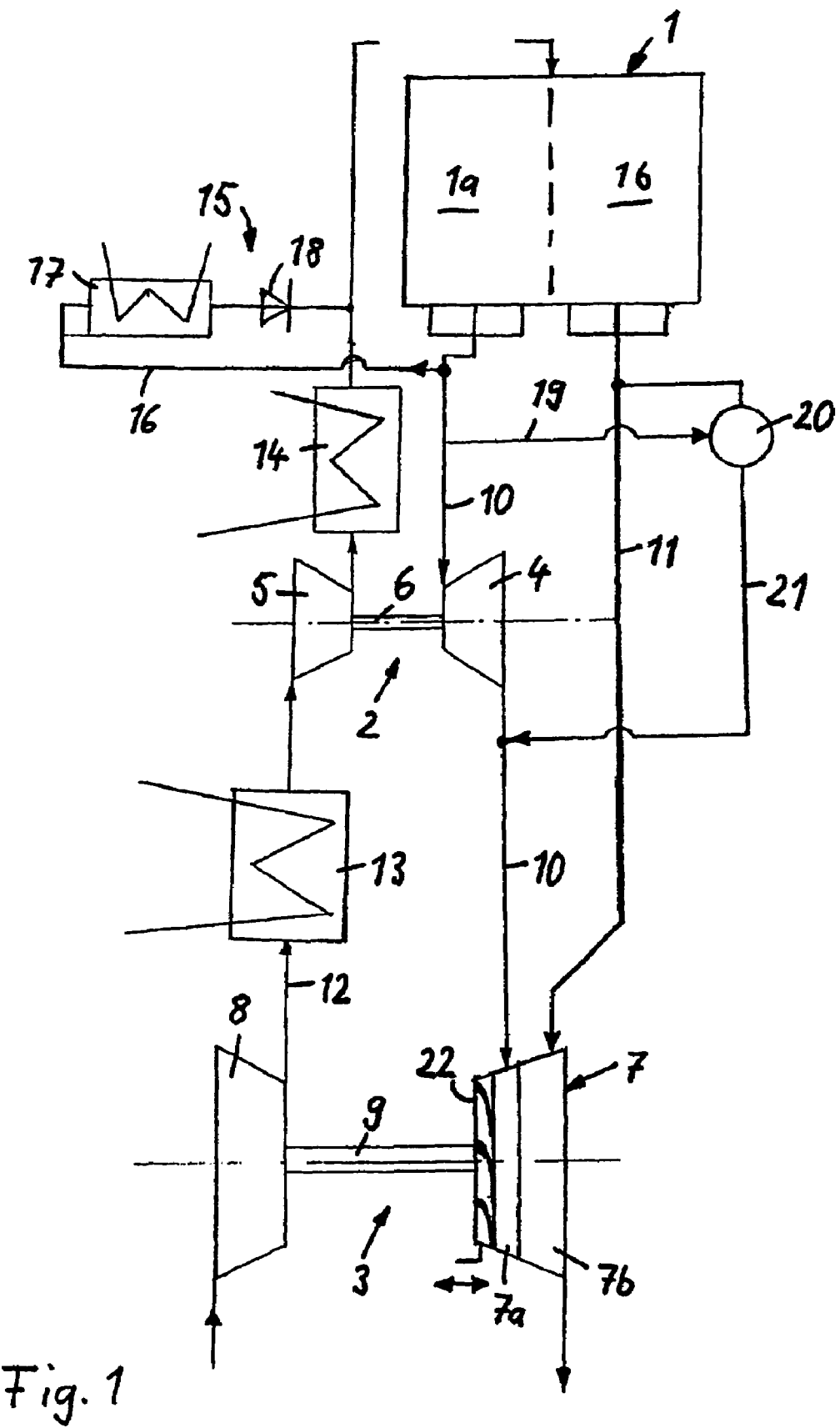
FIG. 1 is a schematic illustration of an internal combustion engine with two-stage supercharging and an exhaust gas recirculation device, the two exhaust gas turbines being connected in series and the exhaust gas turbine which is disposed remote from the engine having two exhaust gas flow passages to which exhaust gas is supplied via separate exhaust gas lines.
Figure 2:
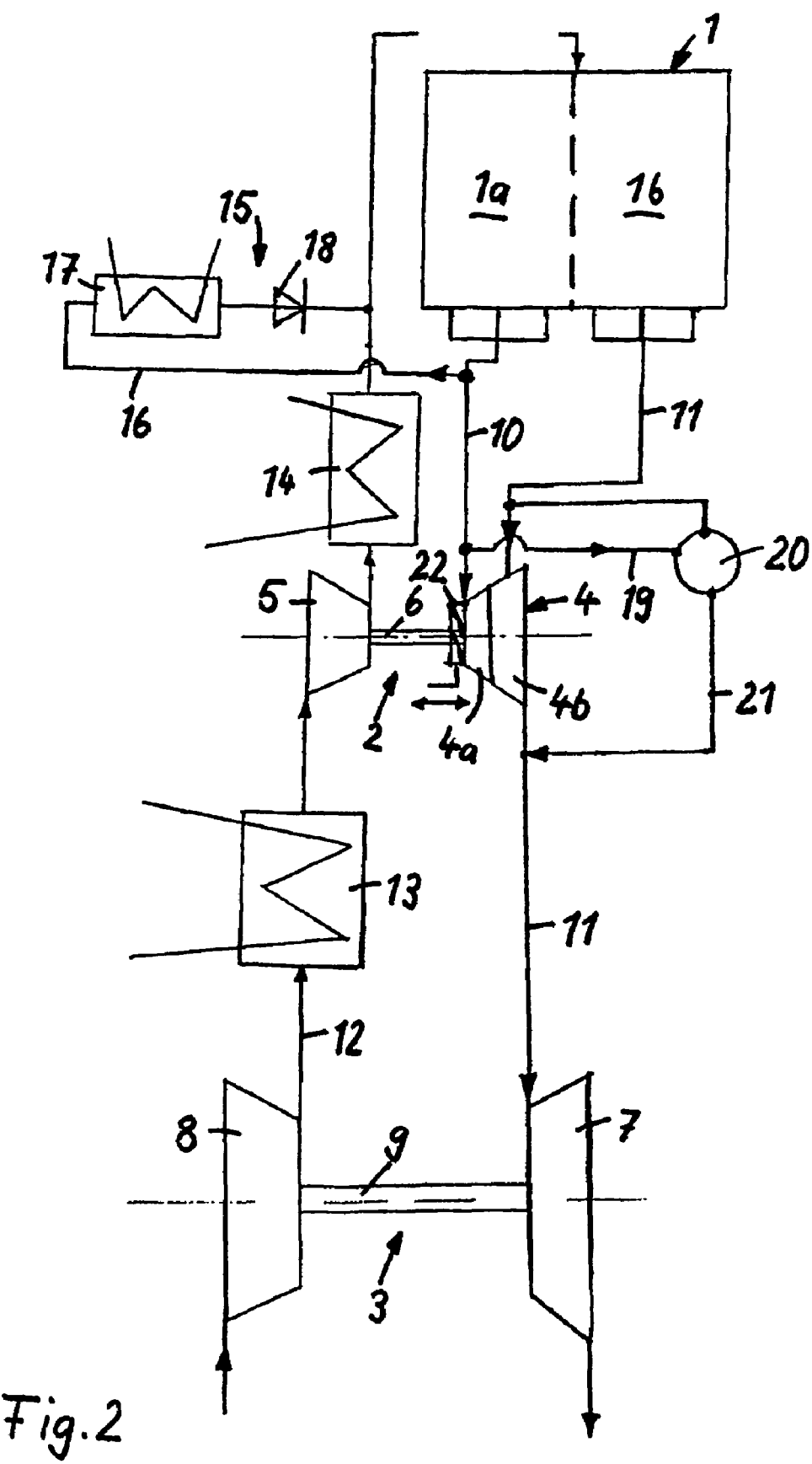
FIG. 2 shows an alternative embodiment of an internal combustion engine corresponding to FIG. 1 in which however the first exhaust gas turbine which is near the engine is provided with two exhaust gas flow passages which are supplied with exhaust gas via separate exhaust gas lines.

The internal combustion engines illustrated in FIGS. 1 and 2 are a spark ignition engine or a diesel engine.

The internal combustion engine 1 illustrated in FIG. 1, has two cylinder banks 1a and 1b, and two exhaust gas turbochargers 2 and 3 connected in series. The first exhaust gas turbocharger 2 is arranged near the engine, and carries out the function of a high pressure supercharger, and the second exhaust gas turbocharger 3 is remote from the engine and carries out the function of a low pressure supercharger. The high pressure supercharger is smaller than the low pressure supercharger and for this reason also has a lower moment of mass inertia. The exhaust gas turbocharger 2 which is near the engine comprises an exhaust gas turbine 4 in the exhaust gas section of the internal combustion engine whose turbine wheel is connected via a shaft 6 to the compressor wheel in the compressor 5 which is located in the intake section 12 of the internal combustion engine. In a corresponding way, the second exhaust gas turbocharger 3, which is remote from the engine, has an exhaust gas turbine 7 in the exhaust gas section and a compressor 8 in the intake section, the rotors of the exhaust gas turbine 7 and compressor 8 being coupled by means of a shaft 9. The compressor 8 of the supercharger which is remote from the engine is located upstream of the compressor 5 of the supercharger which is near the engine, in the intake section 12, and the exhaust gas turbine 7 of the supercharger which is remote from the engine is located downstream of the exhaust gas turbine 4 of the supercharger which is near the engine, in the exhaust gas section. A charge air cooler 13 or 14 is arranged downstream of each of the compressors 8 and 5 in the intake section 12.

Each cylinder bank 1a, 1b of the internal combustion engine 1 is assigned one exhaust line 10 and respectively, 11, the two exhaust lines 10 and 11 being part of the exhaust gas section of the internal combustion engine. The first exhaust line 10 extends from the first cylinder bank 1a to the exhaust gas turbine 4 which is near the engine. The turbine outlet of the turbine 4 is connected via a further line section of the first exhaust line 10 to the exhaust gas turbine 7 which is remote from the engine. The second exhaust line 11 collects the exhaust gases of the second cylinder bank 1b and feeds them directly to the exhaust gas turbine 7 which is remote from the engine.

The exhaust gas turbine 7 which is remote from the engine is a two-flow turbine and has two exhaust gas inlet flow passages 7a and 7b. The first exhaust gas flow passage 7a of the exhaust gas turbine 7 which is remote from the engine is connected via the line section 10 to the outlet of the exhaust gas turbine 4 which is near the engine. The second exhaust gas flow passage 7b is supplied with the exhaust gases from the cylinder bank 1b via the second exhaust line 11. The exhaust gas flow passage 7a and 7b are expediently made separate so that a direct exchange of gas between the exhaust gas flows is prevented. The exhaust gases in the exhaust gas flow passages 7a and 7b are fed to the turbine wheel of the exhaust turbine 7.

The exhaust gas turbine 7 which is remote from the engine can also be provided with a variable turbine geometry 22 which permits the turbine inlet cross-section to be adjusted in a variable fashion between a minimum backpressure cross-section and a maximum opening cross-section. The variable turbine geometry 22 permits, inter alia, the implementation of a turbo-braking function.

Furthermore, the internal combustion engine 1 is equipped with an exhaust gas recirculation device 15 which comprises an exhaust gas recirculation line 16, an exhaust gas cooler 17 arranged therein and an adjustable nonreturn valve 18. The exhaust gas recirculation line 16 branches off from the first exhaust line 10 upstream of the first exhaust gas turbine 4 which is near the engine, and leads into the intake duct 12 downstream of the second charge air cooler 14 which is assigned to the compressor 5 which is near the engine. The non-return valve 18 of the exhaust gas recirculation device 15 can be opened in order to transfer exhaust gas into the intake duct 12 in operating states in which the exhaust gas back pressure in the exhaust line 10 exceeds the charge pressure in the intake section 12.

The two exhaust lines 10 and 11 are in communication with one another via a bypass line 21 which branches off from the exhaust line 11 upstream of the exhaust gas turbine 7 which is remote from the engine, and leads into the exhaust line 10 downstream of the exhaust gas turbine 4 which is near the engine. An adjustable nonreturn valve 20 is arranged in the bypass line 21. Exhaust gas can be transferred between the exhaust lines using the bypass line 21.

Furthermore, the first exhaust line 10 is connected via a line section 19 to the bypass line 21, upstream of the exhaust gas turbine 4 which is near the engine, via the non-return valve 20. The non-return valve 20 can assume various positions. In a first position of the non-return valve 20, only the line section 19 is opened and the upper section of the bypass line 21 which branches off from the exhaust line 11 is shut off, as a result of which a bypass bypassing the exhaust gas turbine 4 which is near the engine is established. In a second position of the non-return valve, the line section 19 is shut off and the upper section of the bypass line 21 which branches off from the exhaust line 11 is opened so that an exchange of gas can be brought about between the second exhaust line 11 upstream of the second exhaust gas turbine 7 which is remote from the engine and the first exhaust line 10 downstream of the exhaust gas turbine 4 which is near the engine. In a third position, both the line section 19 and the upper section of the bypass line 21 can be opened. In a fourth position, both lines or line sections are shut off.

In the exemplary embodiment according to FIG. 2, the exhaust gas turbine 7 which is remote from the engine has a single flow path, and in contrast the exhaust gas turbine 4 which is near the engine is of two-flow path design, with two exhaust gas inlet flows paths 4a and 4b. Furthermore, the exhaust gas turbine 4 which is near the engine has a variable turbine geometry 22 for the purpose of modifying the effective turbine inlet flow cross section. The two exhaust lines 10 and 11, which are each assigned to one cylinder bank 1a or 1b, each lead into an exhaust gas inlet flow path 4a or 4b of the exhaust gas turbine 4 which is near the engine. The outlet of the exhaust gas turbine 4 which is near to the engine is connected via a further section of the exhaust line 11 to the inlet of the exhaust gas turbine 7 which is remote from the engine.

The line section 19 branches off from the first outlet line 10 upstream of the exhaust gas turbine 4 which is near the engine and leads via the nonreturn valve 20 into the bypass line 21 which branches off from the second exhaust line 11 upstream of the exhaust gas turbine 4 which is near the engine, and leads again into the exhaust line section bypassing the exhaust gas turbine 4. As described in the preceding exemplary embodiment, the nonreturn valve 20 can assume various positions in which the bypass line 21 and/or the line section 19 are optionally shut off or opened.

What is claimed is:

1. An internal combustion engine comprising a high pressure turbocharger (2) close to the engine (1) and a low pressure turbocharger (3) further remote from the engine (1), the high pressure turbocharger (2) having a high pressure turbine (4) and a high pressure compressor (5) connected to the high pressure turbine (4) so as to be driven thereby and the low pressure turbocharger (3) having a low pressure turbine (7) and a low pressure compressor (8) connected to the low pressure turbine (7) to be driven thereby, an intake line (12) extending from the low pressure compressor (8) via the high pressure compressor (5) to the engine for supplying pressurized combustion air thereto, said internal combustion engine being divided into first and second sections (1a, 1b), a first exhaust gas line (10) extending from the first section (1a) of the engine (1) via the high pressure turbine (4) to a first section (7a) of the low pressure turbine (7) which first section (7a) is provided with a variable turbine geometry (22) for controlling the pressure in the first exhaust gas line (10) and a second exhaust gas line (11) extending from the second section (1b) of the engine (1) directly to a second section (7b) of the low pressure exhaust turbine (7) providing for a low backpressure in the second exhaust gas line (11) of the second engine section (1b), and an exhaust gas recirculation line (16) branching off the first exhaust gas line (10) upstream of the high pressure turbine (4) and extending to the intake line (12) downstream of the high pressure compressor (5) for recirculating exhaust gas from the first section (1a) of the engine to the pressurized combustion air supplied to the engine (1) under a pressure. controllable by the variable turbine geometry (22) of the low pressure turbine (7).

2. The internal combustion engine as claimed in claim 1, wherein the first exhaust gas line (10) is connected to the first section (1a) of the engine which comprises some of the cylinders of the internal combustion engine (1) and the second exhaust gas line is connected to second section (1b) of the engine which comprises the other cylinders of the engine for conducting the exhaust gases to the turbines (4, 7).

3. The internal combustion engine as claimed in claim 1, wherein the low pressure exhaust gas turbine (7) has two separate exhaust gas inlet flow passages (7a, 7b) via which the exhaust gas is fed into the exhaust gas turbine (7) and which are each connected to one of the two exhaust lines (10, 11).

4. The internal combustion engine as claimed in claim 1, wherein a bypass line (19, 21) is connected to the first exhaust gas line (10) which bypasses the high pressure exhaust gas turbine (4) which is near the engine is provided.

5. An internal combustion engine comprising a high pressure turbocharger (2) close to the engine (1) and a low pressure turbocharger (3) further remote from the engine (1), the high pressure turbocharger (2) having a high pressure turbine (4) and a high pressure compressor (5) connected to the high pressure turbine (4) so as to be driven thereby and the low pressure turbocharger (3) having a low pressure turbine (7) and a low pressure compressor (8) connected to the low pressure turbine (7) to be driven thereby, an intake line (12) extending from the low pressure compressor (8) via the high pressure compressor (5) to the engine (1) for supplying pressurized combustion air thereto, said internal combustion engine (1) being divided into first and second sections (1a, 1b), a first exhaust gas line (10) extending from the first section (1a) of the engine (1) to a first section (4a) of the high pressure turbine (4) which first section (4a) includes a variable turbine geometry (22) for controlling the exhaust gas pressure in the first exhaust gas line (10) and a second exhaust gas line (11) extending from the second section (1b). of the engine (1) to a second section (4b) of the high pressure turbine (4) in which the exhaust gas pressure is lower than in the first section (4a) and from there to the low pressure exhaust gas turbine (7) for conducting exhaust gas of the first and the second engine sections (1a, 1b) jointly from the high pressure turbine (4) to the low pressure turbine (7), and an exhaust gas recirculation line (16) branching of the first exhaust gas line (10) upstream of the high pressure turbine (4) and extending to the intake line (12) downstream of the high pressure compressor (5) for recirculating exhaust gas from the first section (1a) of the engine to the pressurized combustion air supplied to the engine (1) under a pressure controllable by the variable turbine geometry (22) in the first section (4a) of the high pressure turbine (4).

6. The internal combustion engine as claimed in claim 5, wherein one of the exhaust gas lines is connected to the first section (1a) of the engine comprising some of the cylinders of the internal combustion engine (1) and the other exhaust gas line is connected to a second section (1b) of the engine comprising the other cylinders of the engine for conducting the exhaust gases to the turbines (4, 7).

7. The internal combustion engine as claimed in claim 5, wherein the high pressure exhaust gas turbines (4) has two separate exhaust gas inlet flow passages (7a, 7b) via which the exhaust gas is fed into the respective exhaust gas turbine (4) and which are each connected to one of the two exhaust lines (10, 11).

* * * * *